United States Patent [19]

Ball

[11] Patent Number: 4,561,245
[45] Date of Patent: Dec. 31, 1985

[54] TURBINE ANTI-ICING SYSTEM

[75] Inventor: Bennett D. Ball, Anchorage, Ak.

[73] Assignee: Atlantic Richfield Company, Los Angeles, Calif.

[21] Appl. No.: 735,285

[22] Filed: May 16, 1985

Related U.S. Application Data

[63] Continuation of Ser. No. 551,772, Nov. 14, 1983, abandoned.

[51] Int. Cl.⁴ .............................................. F02C 7/047
[52] U.S. Cl. .................................. 60/39.02; 60/39.093
[58] Field of Search ....................... 60/39.093, 39.02; 417/159; 244/134 B, 53 B

[56] References Cited

U.S. PATENT DOCUMENTS

| | | | |
|---|---|---|---|
| 2,680,345 | 6/1954 | Frost | 60/39.093 |
| 2,705,866 | 4/1955 | Quinby et al. | 60/39.093 |
| 2,750,737 | 6/1956 | Leigh | 60/39.093 |
| 4,328,666 | 5/1982 | Cummins, Jr. | 60/39.093 |

Primary Examiner—Carlton R. Croyle
Assistant Examiner—Jeffrey A. Simenauer
Attorney, Agent, or Firm—Robert M. Betz

[57] ABSTRACT

Exhaust gas is recirculated from the exhaust stack of a gas fired turbine to the air inlet along a constantly-open path to prevent inlet freeze-up. When anti-icing is not needed the exhaust stack is fully opened, creating a partial vacuum in the exhaust stack. At the turbine inlet the recirculation line, is opened to atmosphere. The resultant pressure differential between the opposite ends of the recirculation line creates a driving force for positively purging the recirculation line of unwanted residual exhaust gases. This in turn eliminates a source of unwanted moisture which could otherwise condense, freeze and interfere with turbine operations.

5 Claims, 7 Drawing Figures

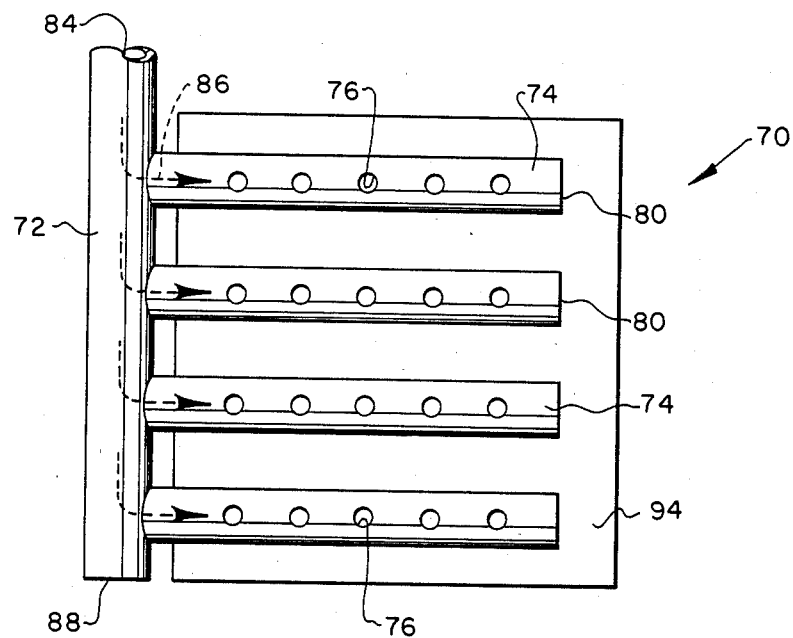
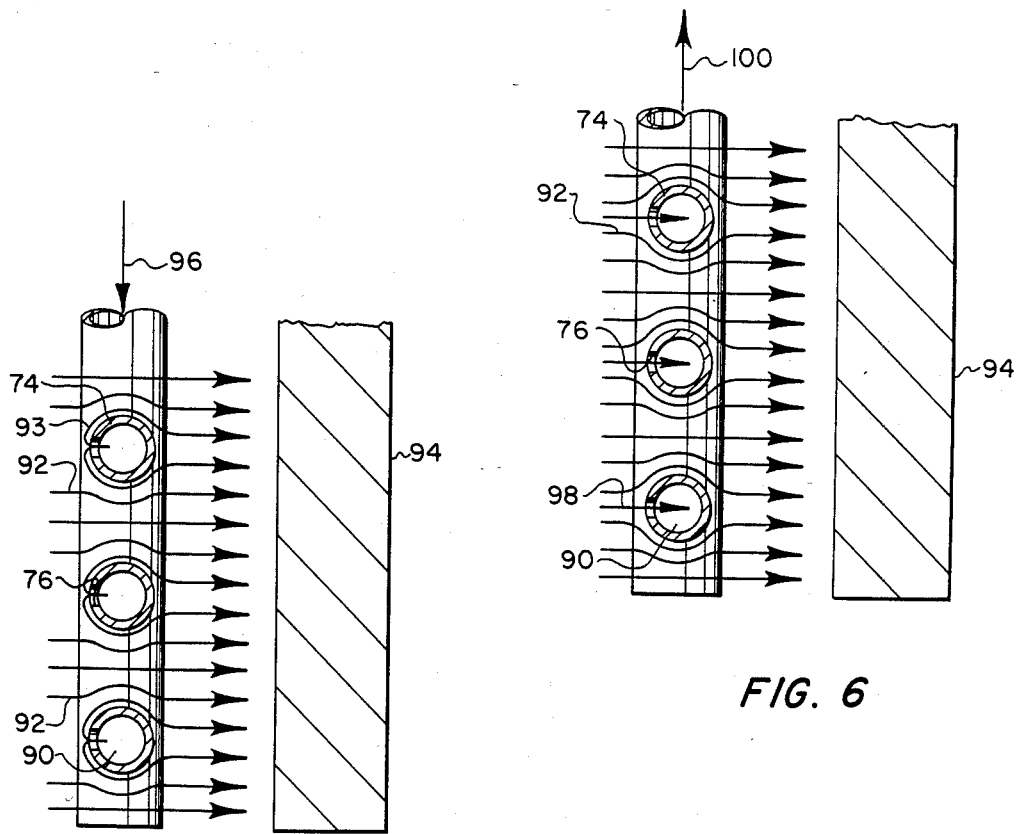
FIG. 4
FIG. 5
FIG. 6

TURBINE ANTI-ICING SYSTEM

This application is a continuation of application Ser. No. 551,772, filed Nov. 14, 1983 now abandoned.

BACKGROUND OF THE INVENTION

1. Field of the Invention

This invention is related generally to the field of gas fired turbines and more particularly to apparatus for prevention of icing in such turbines in the presence of low ambient temperatures.

2. Prior Art

A gas fired turbine draws in fresh air, which is compressed, and then fed into a combustion chamber which provides combustion gas to drive turbine blades. In a cold environment, when ambient temperatures drop below +35° F., the air inlet to the turbine may freeze up due to condensation of water vapor in the air, blowing snow or ice fog. To overcome this problem, some means of anti-icing are essential. In accordance with a typical prior art anti-icing system, a recirculation line interconnecting the air inlet and the exhaust gas stack permits enough hot exhaust gases to be constantly recirculated to the inlet to maintain turbine inlet air temperature at a minimum of +40° F. A bypass valve is positioned in the exhaust stack channel and dampers are provided which can close off the recirculation line. When anti-icing is not needed, the recirculation dampers are closed and the exhaust bypass valve is opened. When anti-icing is needed, the recirculation dampers are opened and the exhaust bypass valve is closed sufficiently to create a back-pressure which forces exhaust gases back to the turbine inlet.

The problem with this prior art system is that when anti-icing is not required, the exhaust gas is allowed to occupy the recirculation line between the exhaust stack and the recirculation dampers. As a result, moisture in the exhaust gas condenses out and accumulates around the recirculation line dampers, causing the dampers to freeze in a closed position. The result is that the dampers are inoperable when needed. To avoid this possibility, gas turbine operators have been forced to constantly recirculate enough exhaust gas to maintain the inlet air temperature at +40° F. so as to prevent the recirculation dampers from freezing. This solution has other drawbacks, including loss of horsepower, constant recirculation of corrosive exhaust gas and a hotter hot-gas path in the turbine. Furthermore, with constant recirculation of exhaust gases, so much moisture is present at the air inlet that when ambient temperature drops below −40° F., condensation may cause the turbine to freeze up on the inlet unless constant attention is devoted to avoidance of this condition.

SUMMARY OF THE INVENTION

The general object of this invention is therefore to provide an improved anti-icing system for a gas fired turbine. A more particular object of this invention is to provide an improved anti-icing system for a gas fired turbine which is effective and reliable but avoids excessive use of exhaust gases for anti-icing purposes.

In accordance with a preferred embodiment of this invention, an anti-icing system is disclosed for a gas fired turbine having an air inlet and an exhaust stack open to the atmosphere which are interconnected with a constantly open free-flowing recirculation line. An exhaust by-pass valve in the exhaust stack may be operated from fully opened to partially closed. In the partially-closed condition of such valve, sufficient back-pressure is created to force recirculation of exhaust gas to the turbine inlet through the recirculation line. When anti-icing is not necessary, the bypass valve is fully opened to create a partial vacuum within the exhaust stack. With the air inlet end of the recirculation line open to atmosphere a pressure-differential is created which causes air to be drawn from the recirculation line into the exhaust stack thus purging the recirculation line of unwanted residual exhaust gases.

In the preferred embodiment, the recirculation line comprises a recycle manifold consisting of an open-ended recycle header interconnected with a plurality of parallel closed-end air distribution pipes each provided with vent holes facing the direction of inlet air. In an anti-icing operation, hot exhaust gas enters the distribution pipes at one end from the header and discharges through these vent holes to mix with slow-moving ambient inlet air which is then drawn into the turbine through a turbine filter or inlet screens. When anti-icing is not needed, purge air is drawn into the recycle header from the vent holes in the distribution pipes.

Further objects and advantages of this invention will become apparent from a consideration of the detailed description to follow taken in conjunction with the appended drawings and claims.

BRIEF DESCRIPTION OF THE DRAWINGS

FIG. 4 is a diagrammatic representation of an exhaust gas recycle manifolding apparatus in accordance with the preferred embodiment of this invention.

FIG. 5 is a diagrammatic representation of a detail of the manifolding apparatus of FIG. 4 when anti-icing is required.

FIG. 6 is a diagrammatic representation of a further detail of the manifolding apparatus of FIG. 3 when anti-icing is not required.

DETAILED DESCRIPTION OF THE PREFERRED EMBODIMENT

Figure 1:
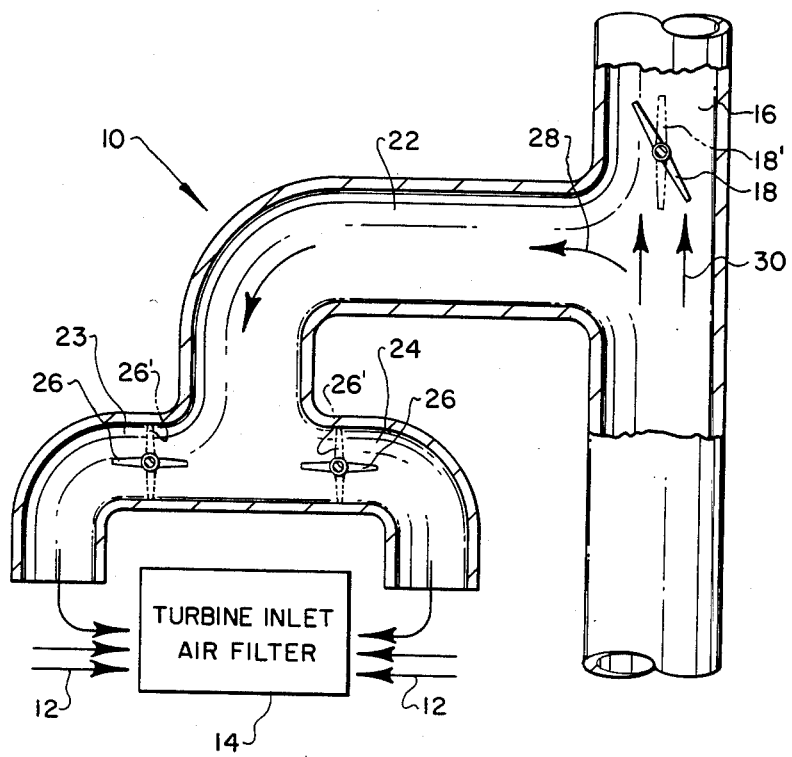
FIG. 1 is a flow diagram of a gas turbine anti-icing system in accordance with the prior art.

With reference now to FIG. 1, in a gas fired turbine anti-icing system 10 in accordance with the prior art, inlet air 12 is drawn into turbine inlet air filter 14 to support gas combustion, while exhaust gases are expelled through turbine exhaust stack 16. An exhaust bypass valve 18 situated within exhaust stack 16 may be rotated so as to vary the number of degrees from a fully-open position indicated in dotted outline by the reference numeral 18 prime. Recirculation piping consisting of lines 22, 23 and 24 provides a path from exhaust stack 16 to the air inlet to air filter 14. Recirculation damper valves 26 are inserted in lines 23 and 24.

In an anti-icing operating, bypass valve 18 is partially closed and recirculation dampers 26 are opened to assume the dotted position indicated by the numeral 26 prime. Sufficient back pressure in exhaust stack 16 is then created to force a certain amount of exhaust gas along recirculation path 28 through lines 22, 23 and 24 and thus to the inlet to turbine air filter 14. When anti-icing is not required, bypass valve 18 is opened and dampers 26 are closed. Exhaust gas then proceeds exclusively along path 30.

As previously noted, the problem with this arrangement is that residual exhaust gas in recirculation line 22 is not purged. As a result, the moisture in such gas tends to condense, accumulate around recirculation dampers 26 and then freeze dampers 26 in a closed position. When this happens, of course, anti-icing is not available when required. The only alternative to avoid this possibility is to maintain a constant recirculation of exhaust gas with its attendant disadvantages as explained.

Figure 7:
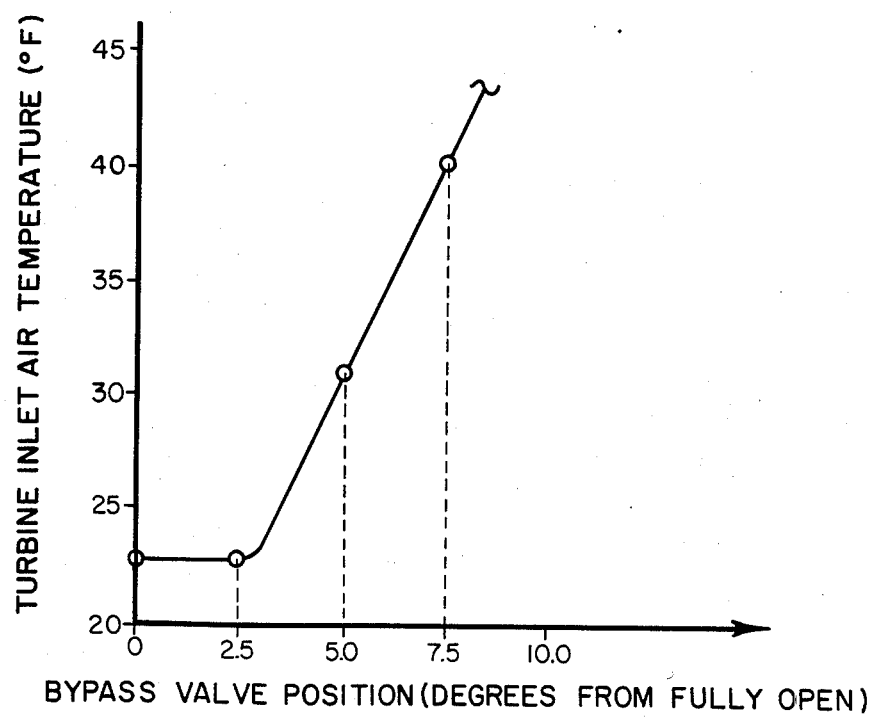
FIG. 7 is a graph of a typical relation between bypass valve position and turbine inlet air temperature for a turbine anti-icing system of the type described.

One reason for this problem is that prior art systems such as shown in FIG. 1 typically include a mechanical stop (not shown) within the exhaust stack 16 which prevents valve 18 from reaching fully open position 18 prime. The purpose for this stop is to prevent valve flutter. Tests show that depending upon the particular mechanical configuration of the components of a turbine anti-icing system and its operating condition, exhaust gas recirculates to the turbine inlet at some small bypass valve angle. FIG. 7 illustrates this relationship, and shows that so long as valve 18 is stopped before reaching fully open position 18 prime complete purging of recirculation lines 22, 23 and 24 may not occur. For example the graph indicates that at some angle slightly in excess of 2.5 degrees turbine air inlet temperature starts to rise rapidly. However, even eliminating the mechanical stop and allowing bypass valve to operate in the fully open position 18 prime will not achieve the advantages of applicant's system as will be seen.

Figure 2:
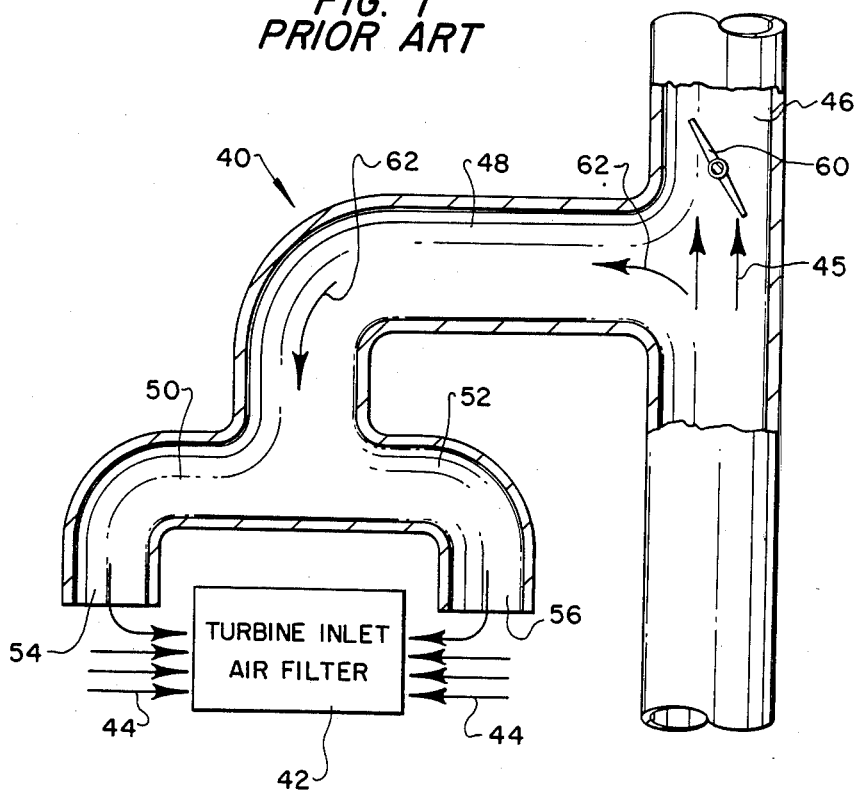
FIG. 2 is a flow diagram of a gas turbine anti-icing system in accordance with the preferred embodiment of this invention when anti-icing is required.
Figure 3:
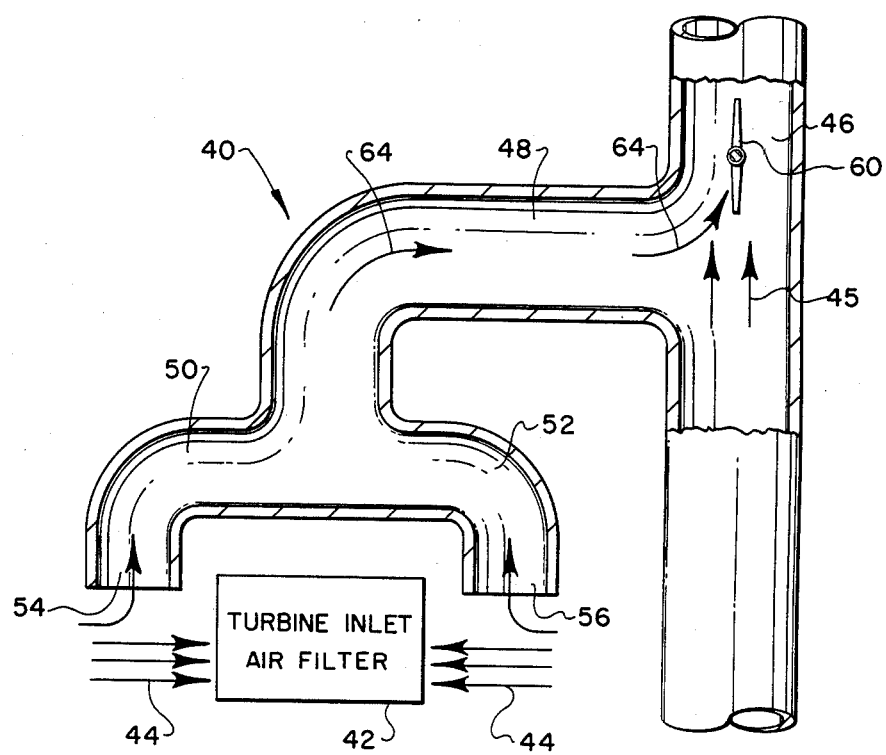
FIG. 3 is a flow diagram of a gas turbine anti-icing system in accordance with the preferred embodiment of this invention when anti-icing is not required.

In the flow diagram of FIG. 2, an improved anti-icing system 40 comprises turbine inlet air filter 42 adapted to receive ambient inlet air 44 and to expel exhaust gases 45 through exhaust stack 46. Exhaust gas recirculation means are provided consisting of line 48 interconnected with stack 46 at one end and at the other end with lines 50 and 52 whose ends 54 and 56 adjacent the inlet to inlet filter 42 are open to the atmosphere. When anti-icing is required, exhaust bypass valve 60 is closed sufficiently to cause a back pressure which forces exhaust air into recirculation line 48 along line 62 which passes unimpeded through lines 50 and 52 to intermingle with inlet air 44. In FIG. 3, the same system 40 is operated when anti-icing is not required. In this mode, bypass valve 60 is fully opened causing a partial vacuum within exhaust stack 46. This partial vacuum together with the atmospheric pressure at line ends 54 and 56 creates a pressure differential which purges lines 48, 50 and 52 along path 64, thus eliminating therefrom residual exhaust gas with its attendant problems.

A significant advantage of the arrangement described in FIG. 2 and FIG. 3 is of course the elimination of the damper valve 26 as discussed in connection with the prior art system of FIG. 1 and thus of the possibility of the malfunction of such devices. The apparatus of FIG. 2 and FIG. 3 also therefore eliminates the need for constant recirculation of exhaust gas to the inlet to the turbine.

In the practice of this invention it is important to maintain full atmospheric pressure at the point in the recirculation lines such as ends 54 and 56 where they open up at the inlet to filter 42. This maximizes the driving force so that under the conditions of FIG. 3 recirculation piping 48, 50 and 52 is constantly purged with air. FIG. 4 illustrates one means for accomplishing this purpose. A recycle exhaust gas manifold 70 comprises recycle header 72 interconnected at spaced-apart intervals with a plurality of closed-end distribution pipes 74 each of which is in turn provided with spaced-apart vent holes 76 facing the upstream direction from which inlet air flows. The ends 80 of distribution pipes 74 remote from header 72 are closed. When anti-icing is required exhaust gases enter header 72 at inlet 84, are distributed into pipes 74 along paths 86, and vented to atmosphere through holes 76, the opposite end 88 of header 72 being closed. As best seen in the detail of FIG. 5, exhaust gas entering distribution pipes 74 from header 72 mixes with low velocity inlet air 92 along paths 93 before striking turbine inlet screens 94. The direction of flow through header 72 is indicated by arrow 96. When anti-icing is not required ambient air enters header 72 along paths 98 through vent holes 76 into pipes 74 and delivers purge air to the system along path 100 as seen in FIG. 6.

In a practical design for manifold 70, distribution pipes 74 may, for example, be about 12" in diameter and vent holes 76 about 4" in diameter to insure that they will not freeze over.

It should be understood that all parts of the distribution manifolding 70 must be upstream of all screens, filters and enclosures to establish that header 72 is fully opened to the atmosphere as described. The holes 76 should face the direction from which the inlet air is coming in order to take advantage of the velocity head.

Another critical aspect of the system of this invention is that there be a vacuum inside the exhaust stack. It has been found, for example, that it is advantageous to achieve a vacuum greater than one inch of water inside the stack 46. In order to accomplish this, the diameter of stack 46 should be such as to allow a sufficiently high interior velocity to create such a vacuum. To this end the exhaust stack 46 must also have a low-pressure differential between its end vented to atmosphere and the point at which it is joined by recirculation line 48. For this purpose one should avoid making the stack too narrow which could create back pressures as a result of excessive wall friction. Another caution is that one should not install silencer baffles or any other obstructions in the exhaust stack 46 above the point of connection with recirculation line 48, except of course for the exhaust bypass valve 60 itself. Finally, the valve 60 should exhibit a low-pressure drop across itself in the fully opened position. It should be borne in mind also that valve 60 does not necessarily have to be the full diameter of exhaust stack 46.

As previously noted, with increase of the valve 60 angle both inlet air temperatures and thus turbine operating temperatures rise rapidly. It is known that a small change in turbine air inlet temperature changes the exhaust temperature by approximately a 2½ to 1 ratio and that therefore any increased recirculation of exhaust gas is reflected immediately with an increase in operating temperature. The conclusion is that one should design valve 60 so that one can control inlet air temperature for anti-icing without "overshoot", thereby avoid unnecessarily hot turbine operation. One such design is to make valve 60 tapered like a knife blade toward both ends and give it a total diameter less than that of the internal diameter of stack 60. The optimum configuration will depend upon the particular equipment used. With the system of this invention, because there is always an unobstructed path between exhaust stack 46 and air inlet 42, failure to set by pass valve 60 in a fully open position will be reflected quickly in an increased inlet air temperature. This indication is not achieved in any system which utilizes dampers in the recirculation path. Thus the system of this invention provides means for automatically warning of a potentially dangerous exhaust gas recirculation.

What is claimed is:

1. The method of prevention of icing at the air inlet of a gas turbine incorporating an exhaust stack vented to atmosphere and interconnected with said air inlet by means of a recirculation line comprising the steps of:
    (a) maintaining a constant uninterrupted flow path between the opposite ends of said recirculation line;
    (b) establishing a back pressure within said exhaust stack in the presence of icing conditions sufficient to cause exhaust gas to flow through said recirculation line from said exhaust stack to said air inlet and thereby to heat ambient air entering said inlet; and
    (c) creating a partial vacuum within said exhaust stack upon cessation of said icing conditions sufficient to cause ambient air to flow through said recirculation line from said air inlet to said exhaust stack thereby purging said recirculation line of residual exhaust gases.

2. The method of claim 1 wherein the air inlet end of said recirculation line is constantly vented to atmosphere.

3. The method of claim 1 wherein said exhaust gases are expelled from said recirculation line during said icing conditions in a direction opposite to the flow of ambient air to said air inlet and in the path thereof.

4. The method of claim 3 wherein said exhaust gases are expelled along a plurality of spaced apart paths.

5. The method of claim 1 wherein said back pressure and said partial vacuum are created by varying the setting of a bypass valve in said exhaust stack from a partially closed to a fully open position.

* * * * *